United States Patent

[11] 3,584,303

[72] Inventor Gustav Guanella, Zurich, Switzerland
[21] Appl. No. 798,336
[22] Filed Feb. 11, 1969
[45] Patented June 8, 1971
[73] Assignee Patelhold Patentverwertungs & Electro-Holding AG, Glarus, Switzerland
[32] Priority Feb. 12, 1968, Feb. 12, 1968
[33] Switzerland
[31] 1981/68 and 1982/68

[54] STEP-BY-STEP FREQUENCY WOBBLED AND ADDRESS-CODED TRANSMISSION SYSTEM

6 Claims, 14 Drawing Figs.

[52] U.S. Cl. .......... 325/55, 325/35, 325/64, 325/131
[51] Int. Cl. .......... H04k 1/10, H03b 23/00
[50] Field of Search .......... 325/32, 33, 34, 35, 55, 64, 131; 343/177, 179; 179/15 ASYNC, 1.5

[56] References Cited

UNITED STATES PATENTS

| | | | |
|---|---|---|---|
| 2,448,055 | 8/1948 | Silver et al. | 325/33 |
| 3,098,220 | 7/1963 | DeGraaf | 325/35 |
| 3,310,802 | 3/1967 | Coleman et al. | 325/33 |
| 3,426,279 | 2/1969 | Berman | 325/55 |
| 3,470,477 | 9/1969 | Battail et al. | 325/55 |
| 3,484,693 | 12/1969 | Fong | 325/34 |

*Primary Examiner*—Richard Murray
*Assistant Examiner*—James A. Brodsky
*Attorney*—Greene & Durr ABSTRACT: In a wobbled frequency radio transmission system of the type including synchronized transmitting and heterodyning frequency signal generators at the transmitter and receiver, respectively, the transmitting frequency is wobbled step-by-step between lower and upper limits about a discontinuous saw-tooth-shaped mean line subdivided into a plurality of successive mutually time-delayed sections comprising equal numbers of frequency steps, to effect synchronization of the receiver with the transmitter and to produce a predetermined sequency of intermediate frequency address code pulses by heterodyning of the received transmitting signal with a local oscillating searching signal being step-by-step frequency-wobbled about a continuous mean line. The address code pulses are applied to a recognition circuit which serves to produce a control signal operating a switch, to change from the local oscillating searching signal with continuous mean line to a local oscillating receiving signal having a discontinuous mean line similar to the transmitting signal, to enable transmission of a communication from said transmitting to said receiving station.

INVENTOR
GUSTAV GUANELLA
BY
KARL RATH
ATTORNEY

INVENTOR
GUSTAV GUANELLA
BY KARL RATH
ATTORNEY

INVENTOR
GUSTAV GUANELLA
BY
KARL RATH
ATTORNEY

INVENTOR
GUSTAV GUANELLA
BY KARL RATH
ATTORNEY

STEP-BY-STEP FREQUENCY WOBBLED AND ADDRESS-CODED TRANSMISSION SYSTEM

The present invention relates to frequency-keyed address-coded carrier signal transmission, more particularly to the provision of improved means in a transmission system of this type to establish and maintain a substantially instant and disturbance-free synchronism between the step-by-step (heterodyning) frequency variations at the receiver with the step-by-step frequency variations of the transmitted carrier signals according to a predetermined keying program, the latter embodying a definite "frequency word" or address code serving for station calling and identification as well as synchronizing purposes.

In variable frequency carrier transmission, the synchronous periodic or wobbling frequency variations at both the transmitter and receiver may be either continuous or discontinuous, that is, step-by-step according to a prearranged pattern or program allocated to a particular communication system or transmission link. Continuous frequency variation has the disadvantage of undesirable receiving frequency deviations, being of an especially serious and objectionable nature in single-side band and FM transmission and caused by even slight deviations or disturbance of the synchronism between the transmitting and heterodyning frequencies. For this reason and in the effort to comply with the practical requirements and problems of multiple frequency generation at both the transmitting and receiving ends, as well as of the provision of both passive and active counter measures, a keyed or step-by-step frequency variation, that is with the frequency varying in discontinuous fashion during successive equal time (keying) intervals and according to a prearranged pattern or program, has been found to possess substantial practical as well as technical advantages over continuous frequency variation transmission systems and techniques.

Accordingly, among the objects of the present invention is the provision of a frequency-keyed carrier signal transmission system of the referred to type which will enable a substantially instantaneous calling and synchronization of a counter station with its cooperating transmitting station, both for the initiation of a signal transmission between a calling station and a called station, as well as during interruptions or failures of the transmission or synchronism, which system will enable a direct inclusion of a desired "frequency word" or address code in the frequency variation program, to ascertain or identify a desired counter station being called, substantially without requiring the transmission of any separate address or calling signal; which will enable a substantially instantaneous and automatic response by the receiver being called without requiring any prolonged searching or scanning periods and operation; which will enable a ready and practically instant control or variation of the transmitting program; which does not require any special synch pulses or signals to be transmitted together with the message signals proper; and which can be realized practically by the use of relatively simple and conventional digital circuits and techniques.

The invention, both as to foregoing and anciliary objects as well as novel aspects thereof, will be better understood from the following detailed description, taken in conjunction with the accompanying drawings forming part of this disclosure and in which.

Like reference characters denote like parts and circuits throughout the different views of the drawings.

Figure 1:
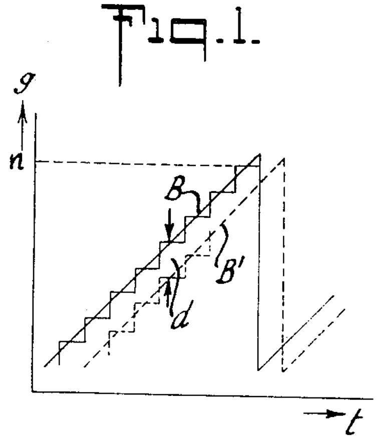
FIG. 1 is a graph showing a simplified step-by-step or keyed-frequency transmitting and receiving frequency pattern, explanatory of the basic function and operation of the invention.

In the following the varying frequencies of the keying programs are advantageously denoted as "frequency numbers" or base frequencies $g$ which may be the actual oscillating frequencies of a bank of crystal oscillators, varying step-by-step from the lower to the upper end ($n$) of the operating frequency range of the system, as shown in FIG. 1. In practice, the base frequencies may be converted into the actual transmitting frequencies $f$ according to a predetermined conversion program by means of a permutation device provided at the transmitter and reconverted to the original base frequencies by a similar complementary device at the receiver. For the purpose of the following description the term frequency is to be understood as the respective "frequency number" or a base frequency, irrespective of any conversion into and reconversion from the actual transmitting frequencies. As an example, in a simplified case with no conversion taking place, the base frequency $g$ equals the transmitting frequency $f$.

For a better understanding of the invention and its operation, the following terms and definitions are of interest:

| | Example 1, fast keying | Example 2, slow keying |
|---|---|---|
| $T_0$=keying interval | 0.1 msec. | 5 msec. |
| $w=1/T_0$=keying frequency "pulse" repetition frequency. | 1,0000/sec. | 200/sec. |
| $z=t/T_0$=time number or position. | | |
| $g(z)$=frequency number or base frequency. | | |
| $f(g)$=transmitting frequency. | | |
| n=number of base frequencies (may be greater or smaller than the number of available transmitting frequencies). | About 80. | About 100. |

Referring more particularly to FIG. 1, there is shown at B the guide line of a saw-toothed shaped step-by-step frequency variation at the transmitter together with a similar line B' for the receiver, line B' being phase-synchronized with and displaced from the transmitting line B by a fixed difference frequency $d$, to result in the response of a heterodyne receiver resonant to said difference frequency. As pointed out hereinbefore, the base frequency $g$ at the transmitter, varying according to the pattern B, may be converted into and reconverted from the actual transmitting frequencies $f$ by means of suitable and preferably interchangeable commutating devices of known construction.

No provision is made in FIG. 1 for the inclusion of an address code in the pattern B, whereby to require the transmission of separate address as well as synchronizing signals for the calling and synchronization of a counter station or receiver.

It is understood for the purpose of this specification that the guide or mean line of a stepped frequency wobbling pattern is the connection of the midpoints of the successive frequency steps, being a straight line in case of a continuous step pattern of constant amplitude and spacing, as shown by FIG. 1. Where a mean frequency line is shown therefore in the drawings, the same is to be considered as having superimposed thereon a step pattern in the manner shown by FIG. 1.

Figure 2A:
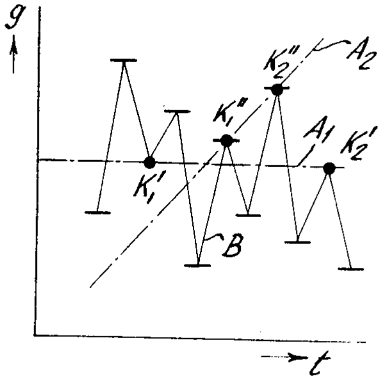
FIG. 2A, 2B and 2C are graphs illustrating programmed variations of the transmitter and receiver frequencies according to the invention, including a "frequency word" or address code and a search or scanning frequency line or pattern for use at the receiver.

Referring to the more complex frequency variation program according to FIG. 2A, the frequencies *g* vary irregularly within the operating range of the system. According to the present invention, there is provided a variable search frequency signal having a guide line $A_1$ or $A_2$ and operative during the initial or search period preceding the signal or message transmission proper, to produce a predetermined series or pattern of frequency "hits" or coincidences of the received and local oscillating or heterodyning frequencies, by "coincidence" being understood a definite frequency difference *d*, FIG. 1, between said frequencies, to result in a constant intermediate frequency impressed upon the signal receiver. Assuming, for instance, a constant search frequency, in which case the search line $A_1$ is parallel to the time axis as shown in FIG. 2A, this will result in the frequency "hits" $K_1'$ and $K_2'$ in the example illustrated. If the mean search frequency varies linearly at an angle with the time axis as shown at $A_2$, the resulting frequency "hits" will be at $K_1''$ and $K_2''$, Fig. 2A.

In the following, only the mean frequency or guide lines A and B of the frequency variations are shown for simplification, it being understood that the actual frequency *g* increases step-by-step along said line in accordance with the keying frequency *w*, as pointed out.

In the keying program as shown by FIG. 2A, the frequency "hits" are normally distributed over a relatively wide frequency range, encompassing the entire operating frequency range of the system. There may be additional or error hits or frequency pulses caused by interference, or some of the actual "hits" may be suppressed by the interference, to result in a definite number of effective or useful "hits" to be considered in effecting calling and synchronization of a counter station according to the invention, as more clearly described in the following.

The useful frequency hits may be considered as a definite "-frequency word" characteristic of and suitable for the identification of the respective keying program or counter station, respectively, provided proper consideration is given to possible error hits or suppression of useful hits due to interference. The pattern of the "frequency word" is determined by the frequency hits, that is, $K_1'$, $K_2'$, and $K_1''$, $K_2''$, respectively, FIG. 2A. A disadvantage of the keying program according to the latter figure is the excessive length of the frequency words obtained under actual operating conditions, resulting thereby both in an increased susceptibility to interference and in the requirement of relatively large storage devices or circuits for the reception and evaluation of the received signals.

Figure 2B:
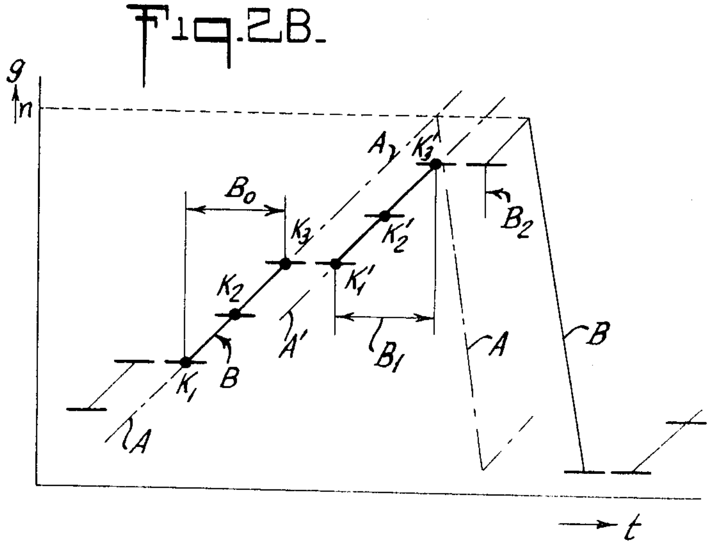

A reduction of the length of the "frequency word" is possible by a proper configuration of the keying program, such for instance as shown by FIG. 2B, wherein the guide line B is shaped to repeatedly pass through the same number of or pattern of frequencies. More particularly, the sawtooth guide line B has a staircaselike shape comprising successive subsections $B_o$, $8_1$, $B_2$,.. spaced by constant time intervals, such as a single step or frequency pulse, according to the example illustrated. This arrangement has the advantage that a frequency search line A at the receiver will result in the same "frequency word" $K_1$, $K_2$, $K_3$ and $K_1'$, $K_2'$, $K_3'$ for a number of time phase positions of the line A (see line A'), forming the same angle with the time axis as the line B of the transmitting program. The advantage thereof is a simplification of the searching and synchronizing operation at receiver, as will become more apparent as the description proceeds.

Figure 2C:
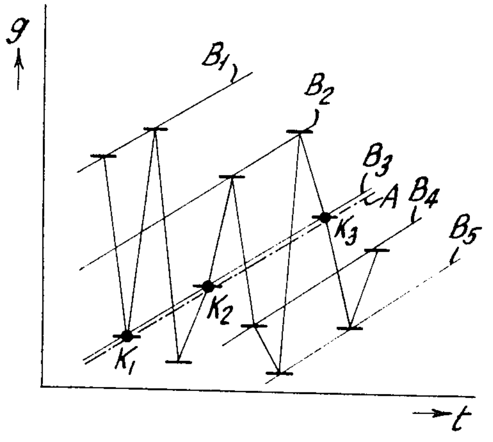

According to the program shown by FIG. 2C, the base frequencies *g* are distributed over a number of parallel guide lines $B_1$, $B_2$, $B_3$, $B_4$, $B_5$, whereby to produce an accumulation of hits $K_1$,$K_2$, $K_3$ whenever the search line A coincides with one of said lines, such as with line $B_3$ in the example shown, or is spaced from said line by a constant distance, respectively.

Figure 3A:
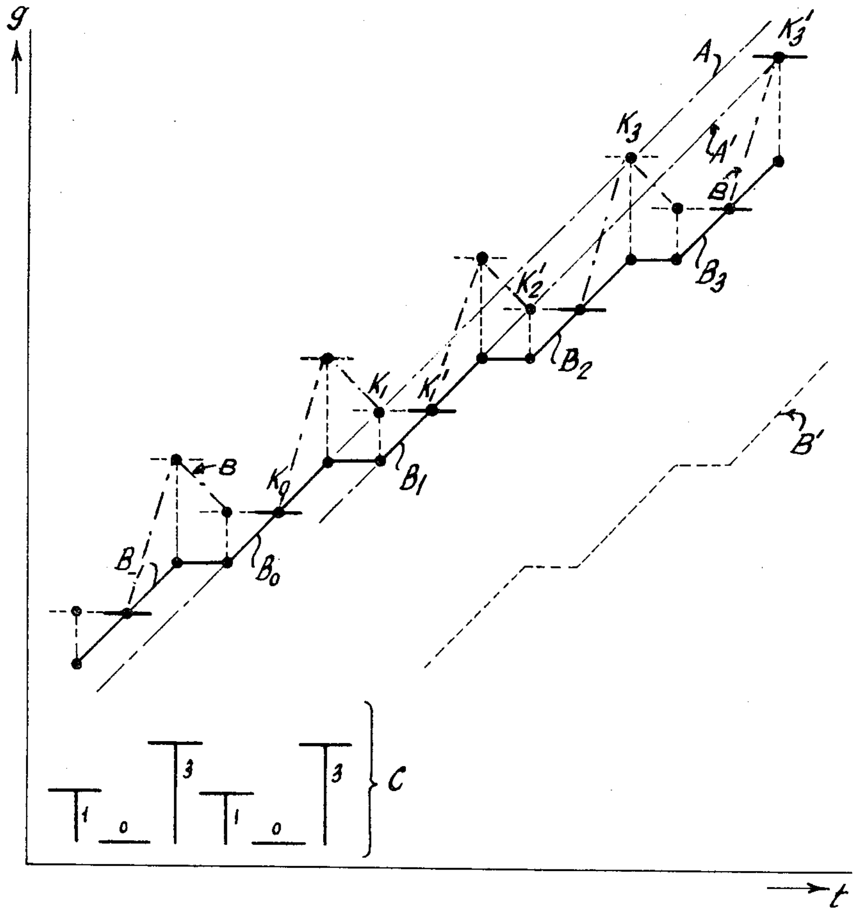
FIGS. 3A and 3B are graphs illustrating preferred frequency keying programs according to the invention, to enable a substantially instantaneous reception of the code or address signal for identification and synchronization of a receiver being called.

For practical purposes, a program or pattern according to FIG. 2B has been found to have special advantages, especially by the inclusion therein of a periodic subprogram C superimposed upon the main program B or sections $B_{11}$, $B_0$, $B_1$, $B_2$;..., FIG. 3A. A disadvantages of the FIG. 2B program is the repetition of the same "frequency word" for all the subsections $B_o$, $B_1$, $B_2$,...due to the equal spacing of the coincidence points $K_1$, $K_2$, $K_3$ and $K_1'$, $K_2'$, $K_3'$, a drawback overcome by FIG. 3A.

The preferred staircase-shaped frequency keying program shown by FIG. 3A differs from FIG. 2B by the inclusion of the preferably variable subprogram C in the main program B or subsections $B_{11}$, $B_o$, $B_1$, B 2,..., whereby to result in multiple "-frequency words" $K_o$, $K_1$, $K_3$ or $K_1'$, $K_2'$, $_3'$, respectively, of varying spacing between its respective coincidence points or frequency pulses, depending upon the configuration of the specific subprogram C serving as the address of the particular counter station to be called. Furthermore, by repeating the main program B as shown in B' with the latter being suitably time-displaced from B, and utilizing different subprograms for each main program, communication between a single transmitting station and a larger number of counter station may be effected or the two subprograms may be utilized for duplex transmission, in a manner as will be readily understood and become apparent as the description proceeds.

More particularly, the subprogram C, FIG. 3A, shown by way of example, involves a single frequency step being superimposed upon the first step of each of the subsections $B_{11}$, $B_o$, $B_1$,...and of a double frequency step being superimposed upon the third step of each of said subsections, in such a manner as to result in the composite guide line B and frequency hit patterns $K_oK_1$, $K_3$ and $K_1'$, $K_2'$, $K_3'$, respectively, produced by cooperation with the search lines A and A'.

Figure 4:
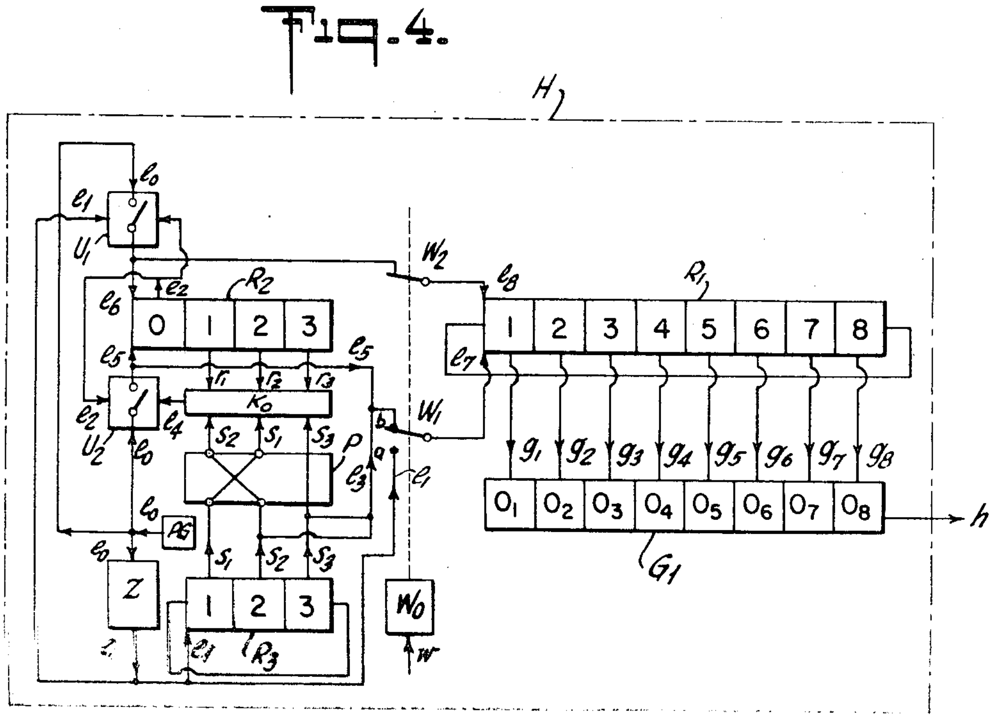
FIG. 4 is a block diagram showing a complete generator system for the production of keyed-frequency programs of the type according to FIG. 3A at both the transmitter and receiver stations, respectively.

Referring more particularly to FIG. 4 which shows in block diagram form a transmitter or keyed-frequency generator H producing a frequency-keyed output signal *h* varying according to the program B of FIG. 3A, the multiple high frequency generator $G_1$ is controlled by a number of input signals $g_1$, $g_2$, $g_3$...$g_8$ each corresponding to a particular frequency number or base frequency. The generator $G_1$ may consist of a number or bank of crystal-controlled oscillators, that is, eight oscillators $O_1$, $0_2$...$0_8$ in the example illustrated. As is understood, any number of oscillators considerably in excess of those shown, together with their associated control circuits, may be provided, to suit existing conditions and requirements.

By the provision of a suitable permutation device before and/or after the generator $G_1$, the base frequencies *g*, varying step-by-step, may be converted into the final transmitting frequencies *f*, in the manner pointed out hereinbefore. The control signals $g_1$, $g_2$...$g_8$ act to connect the coordinated oscillators, to result in the transmission of the respective frequency pulses or signals.

A register $R_1$ in the form of a known ring counter having, in the example shown, eight counting stations numbered 1—8, operates to shift a single input pulse in either the forward or reverse directions, forward shifting being effected by means of input pulses $e_7$ and reverse shifting being effected by means of input pulses $e_8$. During forward shifting or counting, a shift from stage 8 will be back to stage 1, while during reverse shifting a shift from stage 1 will be directly to stage 8. As a consequence, forward shifting by the register $R_1$ will result in the control signals $g_1$, $g_2$,...$g_8$ being successively applied to the stages of the multiple oscillator $G_1$, to control the latter and to cause the generation or transmission of corresponding frequency pulses or signals *h*. During reverse shifting, the control signals and respective frequencies follow each other in the opposite order or direction, in such a manner as to result in a composite keyed-frequency program or guide line B, FIG. 3A, by the alternate control of the register by the forward-shift and reverse-shift pulses $e_7$ and $e_8$, respectively, in the manner described and explained in greater detail in the following. On the other hand, a continued forward shifting by the pulses $e_7$ results in a frequency guide line or pattern or search line A, in the manner as will also become further apparent as the description proceeds.

Generation and inclusion of the subprogram C in the main keying program of FIG. 3A is effected by apparatus including the additional registers $R_2$ and $R_3$ constructed to effect forward shifting of input pulses $e_5$ and $e_1$, respectively. Besides, reverse shifting of $R_2$ is effected by means of input pulses $e_6=e_o$, while $R_3$ is designed as a ring counter involving forward shifting only. The pulse voltages for $R_2$ are derived from the pulses $e_1$, via a pair of electronic gates or switches $U_1$ and $U_2$, the repetition frequency of the pulses $e_o$ being a substantial multiple of the repetition frequency of the pulses $e_1$ corresponding to the keying frequency $w=1/T_o$.

In the example shown, the pulses $e_o$ are produced by a pulse generator PG of known construction and the pulses $e_1$ are derived from the pulses $e_o$ by means of an electronic counter type frequency divider Z also of known construction and supplying an output pulse $e_1$ at the end of successive groups of equal numbered input pulses $e_o$. The three-stage register or ring counter $R_3$ is controlled by the pulses $e_1$ of lower repetition frequency, whereby to produce a series of successive output signals $s_1$, $s_2$ and $s_3$ by its stages numbered 1, 2 and 3 in the figure. Signals $s_1$, $s_2$ and $s_3$ are applied to a permutating device P for the variation of the subprogram C in accordance with the "address" of the desired counter station to be called.

The registers $R_2$ and $R_3$, permutator P and a coincidence circuit KO are interconnected with the switches $U_1$ and $U_2$ and a further multiple changeover switch $W_o$ in the manner shown and understood from the operation of the switching system described and explained in the following.

After connection of the apparatus to its power supply source, at first the switch $U_1$ is closed by a pulse $e_1$, whereby the reverse-shift pulse series $e_8$ of high repetition frequency and derived from $e_o$ acts to shift the excited state of the register $R_2$ to its first or input stage O. The resultant output pulse $e_2$ then acts both to reopen the switch $U_1$ and to simultaneously close the switch $U_2$. As a consequence, there appear at the output of switch $U_2$ the fast keying pulses $e_5$ which act to shift the exciting state of the register $R_2$ in the forward direction, beginning with stage *o* or the zero position previously set in the manner described. The resultant output pulses $r_1$, $r_2$ and $r_3$ of register $R_2$ are successively applied to the coincidence circuit KO to which are also applied the permutated pulses $s_2$, $s_1$ and $s_3$, respectively. The coincidence circuit operates to produce an output pulse $e_4$ at the instance of coincidence of any of the pairs of input pulses $r_1$–$s_2$, $r_2$–$s_1$ and $r_3$–$s_3$, respectively, said output pulse $e_4$ acting to reopen the switch $U_2$. Thus, for instance, if stage 3 of the register $R_3$ is in the excited state, three forward-shift pulses will appear at the input of register $R_2$, that is, until the output pulse $r_3$ coincides with $s_3$ in KO, whereby to interrupt switch $U_2$ and to prevent any further keying pulses $e_5$ being applied to the register $R_1$.

Figure 4A:
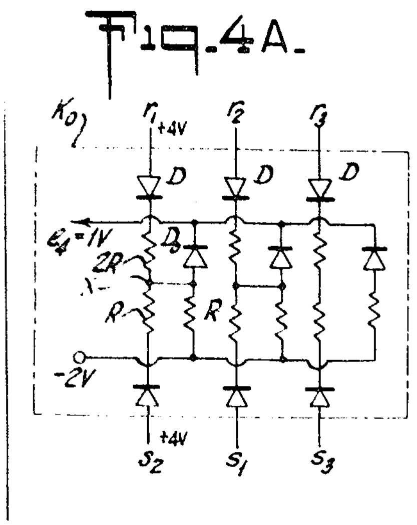
FIG. 4A is a partial diagram more clearly showing the construction of an element of FIG. 4.

The coincidence network KO may be constructed in the manner shown by FIG. 4A, its operation being described in the following. Assuming $r_1$ and $s_2$ to be positive pulses of say +4 volts, a current flow will be established via the diodes D and resistors 2R and R, raising thereby the potential at the junction X to +1 volt. This voltage, in turn, produces, via the diode $D_0$, an output pulse $e_4$ of +1 volt. On the other hand, if one of the input signals $r_1$ and $s_2$ disappears, the potential at point X decreases to zero and no output signal $e_4$ is produced by the circuit. The same operation applies to the remaining pairs of pulses $r_1$, $s_2$ and $r_3$,$s_3$ due to the parallel connection of all three R-$D_o$ circuits of the network KO.

Returning to FIG. 4, the forward-shift pulses $e_5$ are simultaneously impressed, via a switch $W_1$, upon the input of the register $R_1$, as are the reverse-shift pulses $e_8$ applied through switch $W_2$, respectively.

The staircase-shaped and additional control of the register $R_1$ in accordance with the subprogram C, Fig. 3A, is due both to $e_7=e_5+e_3$ and to the effect by the forward-shift pulses $e_3$ comprised of both output pulses $s_2$ and $s_3$ of the register $R_3$.

Figure 5:
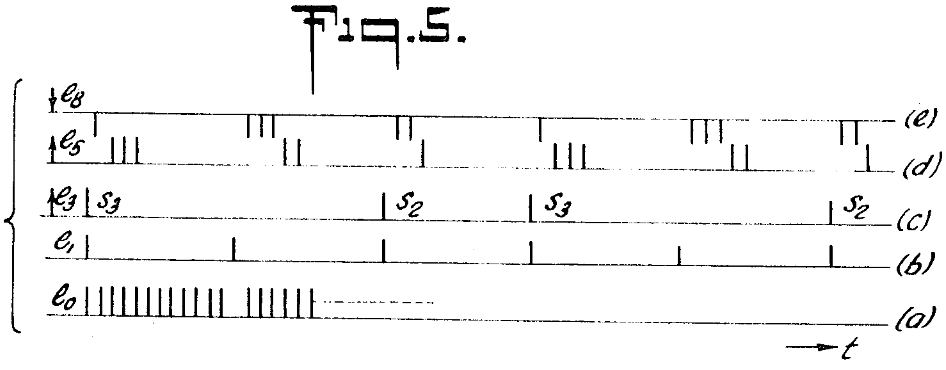
FIGS. 5 and 6 are theoretical diagrams explanatory of the function and operation of FIG. 4.
Figures 6, 7:
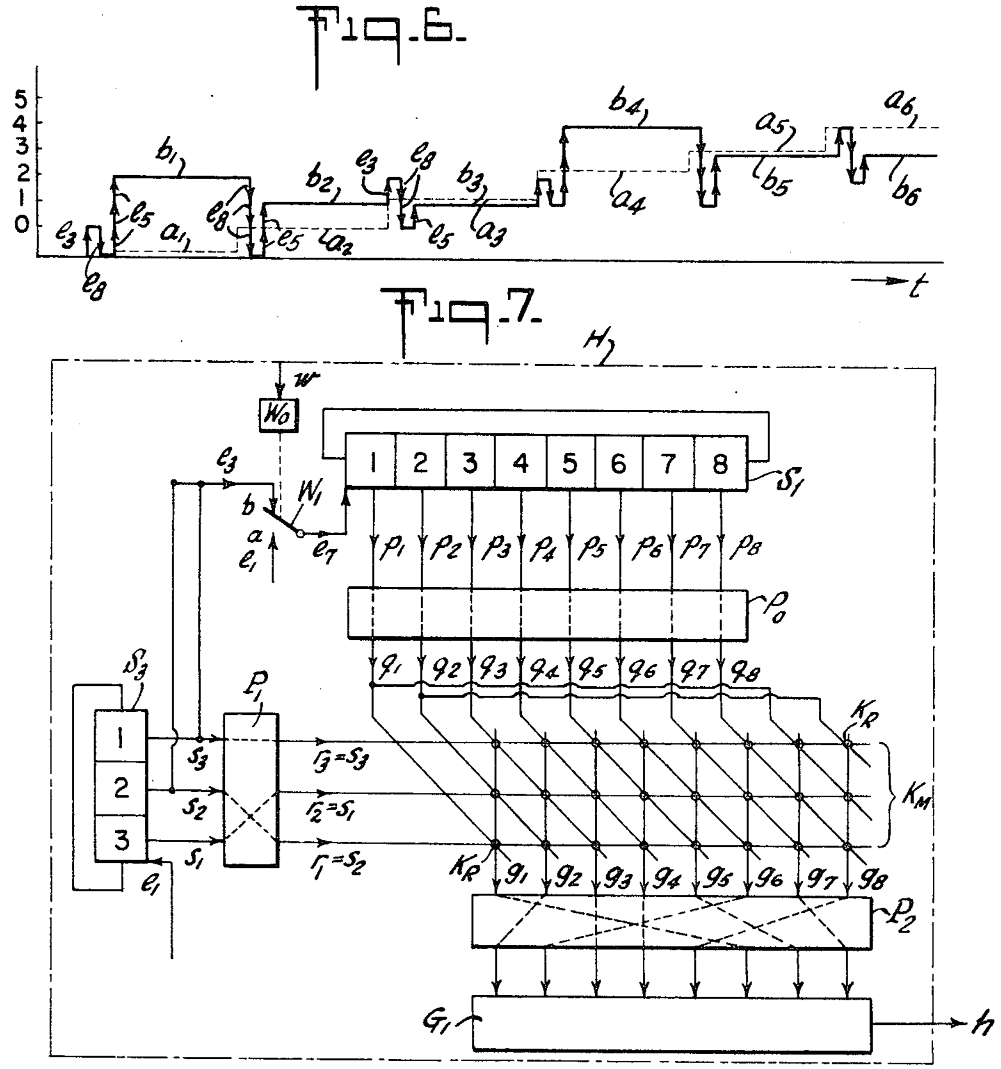
FIG. 7 is a block diagram showing a modification of the keyed-frequency program generator of FIG. 4.

As a consequence, there is obtained a keying frequency pattern or program for the register $R_1$ according to the guide line B, FIG. 3A, and as further illustrated by and understood by reference to FIGS. 5 and 6. More particularly, FIGS. 5*a* and 5*b* show the fast and slow control or clock pulses $e_o$ and $e_1$ supplied by the pulse generator PG and the frequency divider Z, respectively. FIG. 5*c* shows the forward-shift pulses $e_3$ derived from the output pulses $s_2$ and $s_3$ of the ring counter $R_3$, while FIG. 5*d* shows the fast forward-shift pulses $e_7$ whose number is limited by the output pulses of $R_3$, on the one hand, and by the action of the coincidence circuit KO, on the other hand. Finally, FIG. 5*e* shows the fast reverse-shift pulses $e_8$.

In operation, at first a forward-shift pulse $e_7=e_3=s_2$ appears, at the beginning of a keying program, at the input of $R_1$ followed by a reverse-shift pulse $e_8=e_5$, due to the fact that stage 1 of the register $R_2$ has been excited previously. There then follow three forward-shift pulses $e_7=e_5$FIG. 6, because the register receives three forward pulses until coincidence occurs between $r_3$ and $s_3$ during excitation of stage 3 of $R_3$. There remains thus an excess of three forward-shift pulses in the register $R_1$, thus retaining stage 3, in the excited condition and producing a control signal $g_3$ for the oscillator $G_1$ corresponding to the associated frequency number or base frequency $g$, as indicated at $b_1$, FIG. 6. With the occurrence of the next shift pulse $e_1$, the latter causes, via switch $U_1$, at first a reverse-shift followed by a forward shift of $R_1$, by reason of the fact that there appears at the register $R_3$ and output signal $s_1$ resulting, upon coincidence with $r_2$ in KO, in a stopping pulse $e_4$ applied to $U_2$, thereby interrupting the forward-shift pulses applied to register $R_2$. Subsequently, stage 2 of the register $R_1$ continues in the excited stage as shown at $b_2$, FIG. 6. Continued operation then results in the additional keying positions $b_3$, $b_4$,...and setting up of the associated control signals $g_1$, $g_2$...$g_8$, in accordance with the keying program B shown by FIG. 3A.

In the foregoing, the changeover switches $W_1$ and $W_2$ controlled by a relay or the like $W_o$ have been assumed in the operative position *b* of $W_o$, as shown in the drawing, that is, the position obtaining during a signal or message transmission. For searching purposes, prior to the signal transmission, the switches are operated, by means of a control signal *w*, to a position *a* of interruption of $W_2$ and connection of $W_1$ to supply signal pulses $e_3$ to the forward-shift input of $R_1$. In this case, that is with the reverse-shift pulses $e_8$ suppressed, the stages 1—8 of the register $R_1$ are successively excited in the forward direction (See $a_1$, $a_2$, $a_3$,...in FIG. 6), whereby the output signals $g_1$, $g_2$,...$g_8$ follow each other according to the search line A, FIG. 3A. In other words, the switch $W_o$ serves to change from searching to receiving, and vice versa, for the calling of a desired counter station and initiation of a signal transmission, respectively.

In brief, the function of the keying-frequency program generator H, FIG. 4, may be summarized by the successive operations as follows: clearing or setting to zero, via switch $U_1$, of register $R_2$ by a fast reverse-shift pulse $e_6$—forward shift, via switch $U_2$, of both registers $R_1$ and $R_2$ by three (in the example shown) fast forward-shift pulses $e_5$ and $e_7$, respectively, and holding of the excitation of stage 3 of register $R_1$ until the start of the next slow pulse $e_1$ (see $b_1$, FIG. 6)—interruption of pulses $e_5$ upon the opening of switch $U_2$ by the coincidence circuit KO at the start of the next pulse $e_1$ and renewed clearing, via switch $U_1$, of the register $R_2$ by three fast reverse-shift pulses $e_6$—simultaneous opening of $U_1$ and closing of $U_2$ by $e_2$ and forward shift of the registers $R_1$ and $R_2$ by two steps as a result of the function of the coincidence circuit KO—reopening of switch $U_2$ and holding of the excitation of stage 2 of the register $R_1$ until the start of the next following slow pulse $e_1$ (see $b_2$ and $b_3$, FIG. 6) due to the action of the coincidence circuit and the idle stage 0 of the register $R_2$. The same operating cycle is then repeated by the action of the ring counter $R_1$.

In the arrangement according to FIG. 4, the frequency keying program B, FIG. 3A, is produced directly by an alternate forward and reverse shifting of the register $R_1$. According to the alternative embodiment as shown by FIG. 7, the same result is produced by superimposition of a subprogram upon the main frequency keying program. FIG. 7 differs essentially from FIG. 4 by the omission of the fast switching pulses $e_o$, $e_6$ and $e_7$ and of the register $R_2$, that is, by the utilization of a single set of control pulses $e_1$ only having a repetition frequency equal to the basic keying frequency of the system.

FIG. 7 again comprises a main feedback type register $S_1$ or ring counter controlled by the output pulses $e_3$ of an auxiliary ring counter or register $S_3$ which corresponds to the register $R_3$ of FIG. 4. Operation of $S_1$ is again such that only a single stage is excited at a time and that the excitation is shifted in the forward direction to the next stage whenever an input pulse is impressed upon the register, that is, no reverse shifting or counting is employed in FIG. 7. Connected to the stages of $S_1$ is a permutator switch $P_o$ assumed at first as designed for direct through-passage of the output signals $p_1, p_2, ... p_8$ of the register, as indicated by the dotted lines in the figure, to produce intermediate control signals $q_1, q_2 ... q_8$.

KM represents a switching panel or multiple switch composed of horizontal and vertical rows of gates or switching devices KR and serving to selectively control or pass the signals $q_1, q_2 ... q_8$ in accordance with the output signals $r_1, r_2$ and $r_3$ of the register $S_3$ after passing through the permutator switch $P_1$ which corresponds to permutator switch P of FIG. 4.

Figure 8:
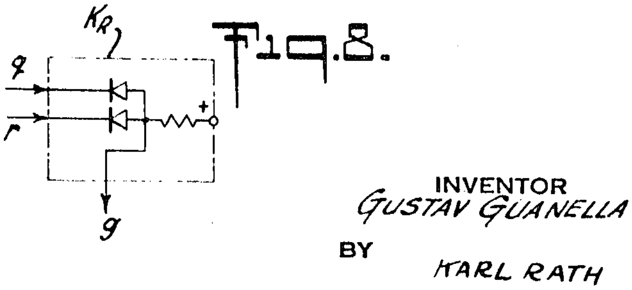
FIG. 8 is a partial diagram more clearly showing the construction of a component element of FIG. 7.

The gates KR at the intersection points of the multiple switch KM are constructed in such a manner as to produce output signals $g$ upon the occurrence of both positive input signals $q$ and $r$ in the manner of an AND-gate, as shown in greater detail by FIG. 8. If the signal $r_2$ is positive, the gates KR of the lowermost row of KM are effective, whereby for instance the output signal $p_4$ of $S_1$ is passed, via $P_o$, through the respective gate and from there to the frequency generator $G_1$ in the form of the control signal $g_4$. Any successive control pulse $e_3$ impressed upon the input of the register $S_1$ will result in the occurrence of the next following control signal $g$. If the changeover switch $W_1$ is operated from its position $b$, as shown, to the position $a$, there is again produced a continuous step-by-step frequency variation program by the pulses $e_1$, corresponding to the search guide line A of FIG 3A. Pulses $e_1$ may again be produced by a suitable pulse generator PG in the manner shown by FIG. 4. 175 More particularly in FIG. 7, generation of the subsections $B_{11}$, $B_0$, $B_1$...of FIG. 3A, is effected by means of a single auxiliary register or ring counter $S_3$, having three counting stages in the example illustrated, and permutator switch $P_1$, corresponding to items $R_3$ and P, respectively, of FIG. 4. Register $S_3$, being controlled by the keying pulses $e_1$, produces consecutive output signals $s_1$, $s_2$ and $s_3$ which, upon mutually interchanging in the permutator $P_1$ according to the desired subprogram or receiving station "address," result in the final output signals $r_1=s_2$, $r_2=s_1$ and $r_3=s_3$, respectively, for the control of the respective gates of KR. As an example, as soon as control pulse $r_1$ is replaced by pulse $r_2$, the frequency control signal $g_4$ coincides with the input signal $p_5$ of the switch KM. The same applies to the remaining control signals, whereby there are produced the necessary shifts of the frequency numbers according to the subprogram C, to result in the composite operating program B of FIG. 3A.

In the foregoing, the changeover switch $W_1$ has been assumed to be in its position $b$, that is, with the control pulses $e_7$ of the register $S_1$ being provided by the output signals $e_3=s_2$, $s_3$ of the register $S_3$. This results in the interruption of guide sections B ,1, $B_o$, $B_1$...after each three forward shifts or counting steps. Superimposed upon the sections $B_{11}$, $B_o$,$B_1$. are the additional shifts of the frequency numbers $g$, depending on the construction of the permutator switch $P_1$, in such a manner as to embody a desired subprogram C or "address" in the keying operation and to result in the final composite frequency keying program according to guide line B of FIG. 3A.

In order to effect keying according to the search guide line A, FIG. 3A, the changeover switch $W_1$ is connected to its position $a$, whereby to effect a continued step-by-step control of the register $S_1$ by the pulses $e_1$. The changeover is again effected by means of a control signal $w$ energizing a relay $W_o$ or the like in the same manner as shown in FIG. 4.

The frequency generator $G_1$ of FIG. 7 may be preceded by a further permutating switch $P_2$ and the output pulses $p_1$, $p_2$...$p_8$ of the register $S_1$ may be interchanged in $P_o$ according to a prearranged program or key, to improve the degree of secrecy of the signals being transmitted.

Figure 3B:
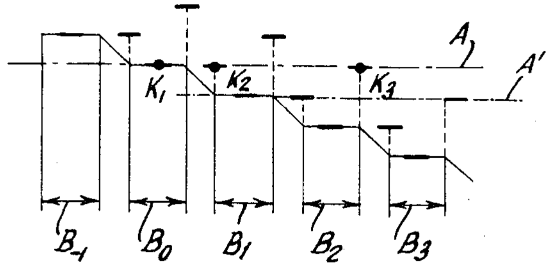

In order to produce a keying program of the modified type according to FIG. 3B, that is, with the guide line sections $B_{11}$, $B_o$, $B_1$...being parallel to the time axis, the control pulses $e_1$ applied to the input $a$ of the changeover switch $W_1$, FIGS. 4 and 7, are suppressed, whereby, with the switch in the $a$-position, a horizontal guide line A results, as shown in FIG. 3B. Similarly, the forward-shift pulses $e_3=s_2,s_3$ are suppressed in the $b$-position of $W_1$, whereby to cause a reverse-shift pulse coinciding with $s_1$, to become effective in such a manner as to depress the guide line by one step or frequency number after each three forward steps, as shown by sections $B_{11}$, $B_o$, $B_1$...of FIG. 3B.

Figure 9:
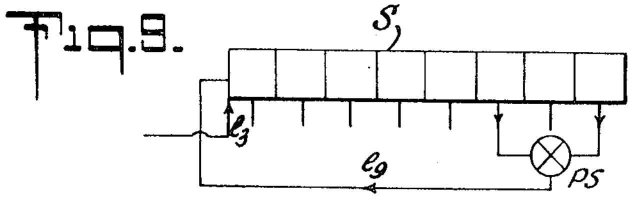
FIG. 9 is a further partial diagram illustrative of an improved feature of the invention.

In order to control a greater number of different frequencies by the aid of a limited number of control signals or voltages $g$, the shift register $R_1$, FIG. 4, or $S_1$, FIG 7, may be constructed as shown in FIG. 9, involving the production of a feedback pulse $e_9$ by the modulation product of two output pulses by means of a modulo 2 adder or exclusive OR-circuit PS. In this case, a plurality of register stages are in the excited condition at any time, whereby to result in a continued change of the distribution of the control signals $g$ of the generator $G_1$. This makes it possible to utilize greater numbers of transmitting frequencies as a result of the numerous possible combinations of control signals.

If a simple staircase-shaped pattern is desired as shown by FIG. 2B, this may be produced by a system according to FIG. 7 by the omission of the multiple switch KM and permutator $P_1$.

Figure 10:
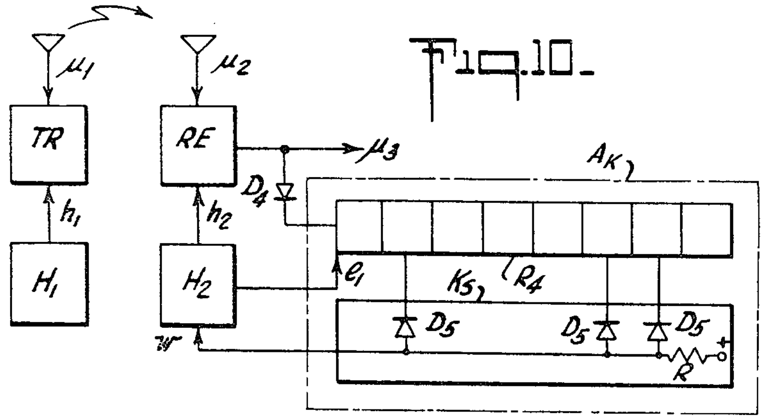
FIG. 10 is a block diagram representing a complete transmission system constructed in accordance with the principles of the invention.

Referring to FIG. 10, there is shown in block diagram form a complete signal transmission system according to the invention. The keying frequency generator $H_1$ produces an output signal $h_1$ applied to the transmitter or amplifier TR, to result in a final output signal $u_1$ for transmission by radio to a receiving station. The received signal $u_2$ is applied to the receiver RE to which is also applied a local heterodyning signal $h_2$ produced by a generator $H_2$ similar to and synchronized with the generator $H_1$ at the transmitter. By a proper adjustment of the oscillating frequencies of $H_1$ and $H_2$, or by heterodyning with a constant frequency, tracking of $H_2$ with $H_1$ by a constant frequency difference $f_o$ may be achieved (see $d$, FIG. 1). As a consequence, an intermediate frequency signal of frequency $f_o$ is produced in the receiver RE which signal is applied as input signal $u_3$ to a conventional intermediate frequency (IF) amplifier of the receiver (not shown), in a manner readily understood.

Assuming that, prior to the calling and connection with a desired receiving station, the transmitting frequency of $H_1$ varies according to the staircase-shaped program or guide line B, FIG. 3A, and assuming further the frequency of $H_2$ in the receiver to vary according to the search guide line A of the same figure, that is with switch $W_1$, in the $a$-position, FIG. 4, an intermediate or beat signal of frequency $f_o$ is applied to both the IF amplifier and to a synchronous control device AK, after rectification by a diode or rectifier $D_4$. The control device AK includes a shift register $R_4$ to the input of which are impressed the received coincidence pulses comprising the "-frequency word" allocated to the respective station. Register $R_4$ is controlled by the shift (clock) pulses $e_1$ of the system derived from $H_2$.

Assuming the reception of a given "frequency word" having a predetermined pulse spacing distance or pattern, a corresponding number of output pulses will appear at the respective stages of the register $R_r$ and are applied to a further control device $K_S$ in the form of an AND-circuit. The latter may be made up in the manner shown by a number of diodes $D_5$ and a resistor R. As a consequence, occurrence of a definite number of output pulses of the register $R_4$, corresponding to a specific "frequency word" will result in an output signal $w$ of the circuit $K_S$, whereby to switch the receiver from "-searching" to "receiving," (position $b$ of switch $W_1$), in the manner as described in reference to FIGS. 4 and 7.

There is thus produced an IF signal of frequency $f_o$, provided that the generators $H_1$ and $H_2$ are maintained in phase synchronism. In case of an interruption of the transmission or disturbance of the synchronism, switch $W_1$ is returned to its *a*-position, to result in a renewed searching operation and restoration of the synchronism in the manner described.

At the time of calling a desired receiving station, the search guide line A may have a time phase position such as to prevent or impede an instant response of the receiver during the initial searching cycles or operations. On the other hand, the use of an adequate number of closely spaced subsections $B_{11}$, $B_o$, $B_1$...of the main program guide line B in cooperation with the inherent phase instability of the searching (sawtooth) cycles practically ensures a response or production of an IF signal of frequency $f_o$ after a relatively small numbers of searching cycles. In other words, the greater the stability of the searching frequency, the greater the number of searching cycles required. In order to expedite the searching process, the searching frequency may be shifted or continuously varied, say within a range of one-half period, where the inherent change is insufficient to ensure a positive reception or response within a minimum number of searching cycles.

In the foregoing, the invention has been described in reference to an illustrative or exemplary system. It will be evident, however, that variations and modifications as well as the substitution of equivalent parts and circuits may be made for those shown for illustration without departing from the broader scope and spirit of the invention. The specification and drawings are accordingly to be regarded in an illustrative rather than in a restrictive sense.

I claim:

1. A wobbled frequency radio transmission system for selectively calling and communicating with one of a plurality of address-coded receivers, said system comprising in combination:

1. a transmitting station including:
   a. transmitting signal generating means having a frequency varying step-by-step from a lower to an upper limit about a discontinuous mean line comprising successive time displaced sections of equal numbers of frequency steps, the last frequency step of one section coinciding with the first frequency step of the next following section,
   b. each said sections having identical frequency step patterns, and
2. a receiving station including:
   a. first local signal generating means connected to said receiving station in its position ready to receive a call from said transmitting station, to produce a first heterodyning signal having a frequency varying step-by-step about a continuous mean line similarly to said transmitting signal,
   b. heterodyning means to combine the received transmitting signal with said heterodyning signal, to produce a signal of predetermined intermediate frequency by beating with a limited number of frequency steps of said transmitting signal, to result in a corresponding predetermined sequence of address code pulses depending upon said frequency step patterns,
   c. second local signal generating means to produce a second stepped heterodyning signal identical with said transmitting signal,
   d. code recognition means connected to the output of said heterodyning means, to produce an output signal upon the occurrence of said predetermined address code pulse sequence, and
   e. switch means operable by said output signal, to disconnect said first heterodyning signal from and to apply said second heterodyning signal to said receiver.

2. A radio transmission system as claimed in claim 1, wherein the frequency pattern of each said sections consists of successive frequency pattern of each equal height and width, whereby to result in an address code pulse sequence of equispaced pulses corresponding in number to the frequency pulses of each said sections.

3. A radio transmission system as claimed in claim 1, wherein the frequency pattern of each said sections consists of successive frequency steps of equal width and irregular height, whereby to result in an address code pulse sequence having unequal pulse spacing intervals.

4. A radio transmission system as claimed in claim 1, said transmitting signal generating means including means to vary said frequency step pattern, to correspond with the code recognition means of a receiving station to be called by said transmitting station.

5. A radio transmission system as claimed in claim 1, wherein the step-by-step frequency variation of said transmitting signal and said heterodyning signals are repeated periodically according to a sawtooth wave.

6. A radio transmission system as claimed in claim 1, wherein said transmitting signal and local signal generating means are comprised of a plurality of stabilized oscillators of progressively increasing carrier frequency being controlled by a ring counter-type shift register and connected to a common transmitting circuit, and wherein said code recognition means consists of a shift register controlled by the received address code pulses and a coincidence circuit having a number of inputs equal to the number of address code pulses and connected to the respective stages of said register in accordance with an assigned address code pulse series, to produce an output signal by said circuit applied to said switch means upon receipt of the predetermined address code pulse series.